US012793528B2

(12) United States Patent
Brito Cardier et al.

(10) Patent No.: US 12,793,528 B2
(45) Date of Patent: Nov. 10, 2026

(54) SYSTEMS AND METHODS FOR IDENTIFYING OPERATIONAL PROFILES OF INDUSTRIAL DEVICES

(71) Applicant: Sensia Netherlands B.V., Rotterdam (NL)

(72) Inventors: Thony Brito Cardier, Dubai (AE); Jeffery P. Anderson, Beaumont (CA); Jonathan Wun Shiung Chong, Calgary (CA); Julio Chen, Houston, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 19/343,993

(22) Filed: Sep. 29, 2025

(65) Prior Publication Data

US 2026/0094513 A1 Apr. 2, 2026

Related U.S. Application Data

(60) Provisional application No. 63/701,232, filed on Sep. 30, 2024.

(51) Int. Cl.
*G08B 21/00* (2006.01)
*G08B 21/18* (2006.01)

(52) U.S. Cl.
CPC .................................... *G08B 21/18* (2013.01)

(58) Field of Classification Search
CPC .. G08B 21/18; G05B 19/042; G05B 23/0216; E21B 2200/20; E21B 43/00
USPC ................. 340/540, 500, 679, 686.1, 539.26
See application file for complete search history.

(56) References Cited

U.S. PATENT DOCUMENTS

| | | | | |
|---|---|---|---|---|
| 9,957,781 | B2 * | 5/2018 | Vennelakanti | E21B 43/00 |
| 2016/0186531 | A1 | 6/2016 | Harkless et al. | |
| 2016/0284128 | A1 | 9/2016 | Michalscheck et al. | |
| 2019/0323321 | A1 | 10/2019 | Weatherhead et al. | |
| 2021/0017847 | A1 * | 1/2021 | Aragall | E21B 21/08 |
| 2021/0277763 | A1 * | 9/2021 | Zheng | E21B 44/00 |
| 2022/0027862 | A1 * | 1/2022 | Yepez | E21B 44/00 |

FOREIGN PATENT DOCUMENTS

WO WO-2022/066235 A1 3/2022

OTHER PUBLICATIONS

Berry et al., "The road travelled so far to ground surveillance robots," 2021, Shell TechXplorer digest 2021, pp. 36-41.

(Continued)

*Primary Examiner* — Anh V La
(74) *Attorney, Agent, or Firm* — FOLEY & LARDNER LLP

(57) ABSTRACT

A system includes industrial equipment providing operations of an oil-and-gas facility, a sensor array system configured to generate sensor data associated with operations of the industrial equipment, and a control system. The control system is programmed to obtain, from the sensor array system, sensor data corresponding to the operations of the industrial equipment, determine, based on the sensor data, operational data corresponding to an operational profile of the operations of the industrial equipment, and operate a display device to provide the display data to a user.

20 Claims, 6 Drawing Sheets

(56) References Cited

OTHER PUBLICATIONS

International Search Report and Written Opinion of the International Searching Authority dated Feb. 4, 2026.

Peerless Ian et al: “A Robot that Removes Operators from Extreme Environments”, SPE, Sep. 28, 2016 (Sep. 28, 2016), XP093354090, Retrieved from the Internet: URL:https://onepetro.org/SPEATCE/proceedings/16ATCE/16ATCE/D031S052R004/186446.

* cited by examiner

SYSTEMS AND METHODS FOR IDENTIFYING OPERATIONAL PROFILES OF INDUSTRIAL DEVICES

CROSS-REFERENCE TO RELATED PATENT APPLICATIONS

This application claims the benefit of and priority to Provisional Application U.S. Application 63/701,232, filed Sep. 30, 2024, incorporated herein by reference in its entirety.

BACKGROUND

The present disclosure relates to hydrocarbon sites. The present disclosure also relates to control systems for hydrocarbon sites including but not limited to control systems configured to identify operational profiles of industrial devices in industrial systems, such as gas, geothermal, helium, and oil well sites.

SUMMARY OF THE INVENTION

One implementation of the present disclosure is a system. The system includes industrial equipment providing operations of an oil-and-gas facility, a sensor array system configured to generate sensor data associated with operations of the industrial equipment, and a control system. The control system is programmed to obtain, from the sensor array system, sensor data corresponding to the operations of the industrial equipment, determine, based on the sensor data, operational data corresponding to an operational profile of the operations of the industrial equipment, and operate a display device to provide the display data to a user.

Another implementation of the present disclosure is a method. The method includes obtaining, from a sensor array system, sensor data corresponding to an operation of a well device of an oil-and-gas facility, determining, based on the sensor data, operational data corresponding to an operational profile of the operations of the well device, generating display data corresponding to at least one of the operational data or the sensor data, and operating a display device to provide the display data to a user.

Some embodiments relate to a well system. The well system includes industrial equipment configured to provide operations of an oil or gas facility, a sensor array system configured to provide sensor data associated with the operations of the industrial equipment, and a controller. The controller is configured to receive, from the sensor array system, sensor data corresponding to the operations of the industrial equipment. determine, based on the sensor data, operational data corresponding to an operational profile of the operations of the industrial equipment, and provide display data corresponding to at least one of the operational data or the sensor data. The controller is configured to operate a display device to provide the display data to a user.

In some embodiments, the sensor array system is positioned remote of the industrial equipment. In some embodiments, sensor array system includes an audio sensor configured to provide audio data corresponding to the operations of the industrial equipment and an image sensor configured to provide image data corresponding to the operations of the industrial equipment. In some embodiments, the sensor data includes the audio data and the image data. In some embodiments, sensor array system includes a position sensor configured to provide position data corresponding to the operations of the industrial equipment, an audio sensor configured to provide audio data corresponding to the operations of the industrial equipment, and an image sensor configured to provide image data corresponding to the operations of the industrial equipment. In some embodiments, the sensor data comprises, the position data, the audio data and the image data. In some embodiments, the controller includes an operations profile module, an image recognition module, a synchronization module, and a display manager. In some embodiments, the controller includes an operations profile module configured to receive sensor data associated with operation of a well device and generate the operational data based on the sensor data that corresponds to operational profiles of the operation of the industrial equipment. In some embodiments, the controller includes an image recognition module configured to implement image recognition methodology to determine image parameters associated with image data. In some embodiments, the controller includes a synchronization module configured to synchronizes the sensor data by comparing timestamps associated with the sensor data and detecting errors associated with the timestamps using a timestamp correction algorithm.

Some embodiments relate to a method. The method includes obtaining, from a sensor array system, sensor data corresponding to an operation of a well device of an oil or gas facility and determining, based on the sensor data, operational data corresponding to an operational profile of operations of the well device. The method also includes generating display data corresponding to at least one of the operational data or the sensor data and operating a display device to provide the display data to a user.

In some embodiments, the sensor array system is positioned remote of the well device. In some embodiments, the sensor array system includes an audio sensor configured to provide audio data corresponding to operations of the well device and an image sensor configured to provide image data corresponding to the operations of the well device. In some embodiments, the method further includes receiving sensor data associated with the operation of the well device and generate the operational data based on the sensor data that corresponds to operational profiles of the operation of the industrial equipment. In some embodiments, the method further includes implementing an image recognition methodology to determine image parameters associated with image data. In some embodiments, the method further includes synchronizing the sensor data by comparing timestamps associated with the sensor data and detecting errors associated with the timestamps using a timestamp correction algorithm.

Some embodiments relate to a system for use with equipment configured to provide operations of an oil or gas facility and a sensor array system configured to provide sensor data associated with the operations of the equipment. The system includes a controller configured to receive, from the sensor array system, sensor data corresponding to the operations of the equipment, determine, based on the sensor data, operational data corresponding to an operational profile of the operations of the equipment, provide display data corresponding to at least one of the operational data or the sensor data, and operate a display device to provide the display data to a user.

In some embodiments, the controller includes an operations profile module configured to receive sensor data associated with operation of a well device and generate the operational data based on the sensor data that corresponds to operational profiles of the operation of the equipment. In some embodiments, the controller includes an image recognition module configured to implement image recognition methodology to determine image parameters associated with image data. In some embodiments, the controller includes a synchronization module configured to synchronizes the sensor data by comparing timestamps associated with the sensor data and detecting errors associated with the timestamps using a timestamp correction algorithm.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

OVERVIEW

Referring generally to the FIGURES, a system can be utilized by one or more edge devices, converged controllers, field controllers, or any other device used to monitor and operate oil-and-gas facilities (e.g., oil extraction site). The system is configured to receive sensor data associated with operations of well devices of the oil-and-gas facilities and identify operational parameters associated the operations of the well devices. The sensor data may be received from a sensor array system including an audio sensor configured to generate audio data associated with the operations of the well devices and an image sensor configured to generate image data associated with the operations of the well devices. In some embodiments, the sensor array system is configured to be positioned remote of the well devices such that the sensor data is obtained without interfacing with the well devices. As a result, the system may allow for operators of the oil-and-gas facilities to determine the operating profiles associated with the operation of the well devices of the oil-and-gas facilities based on the audio data and the image data generated by the sensor array system. While the systems and methods disclosed can be used to monitor, control, and improve industrial equipment, the systems and methods can also be used for a variety of implementations such as manufacturing equipment.

System Overview

Cloud-based Computing System

Figure 1:
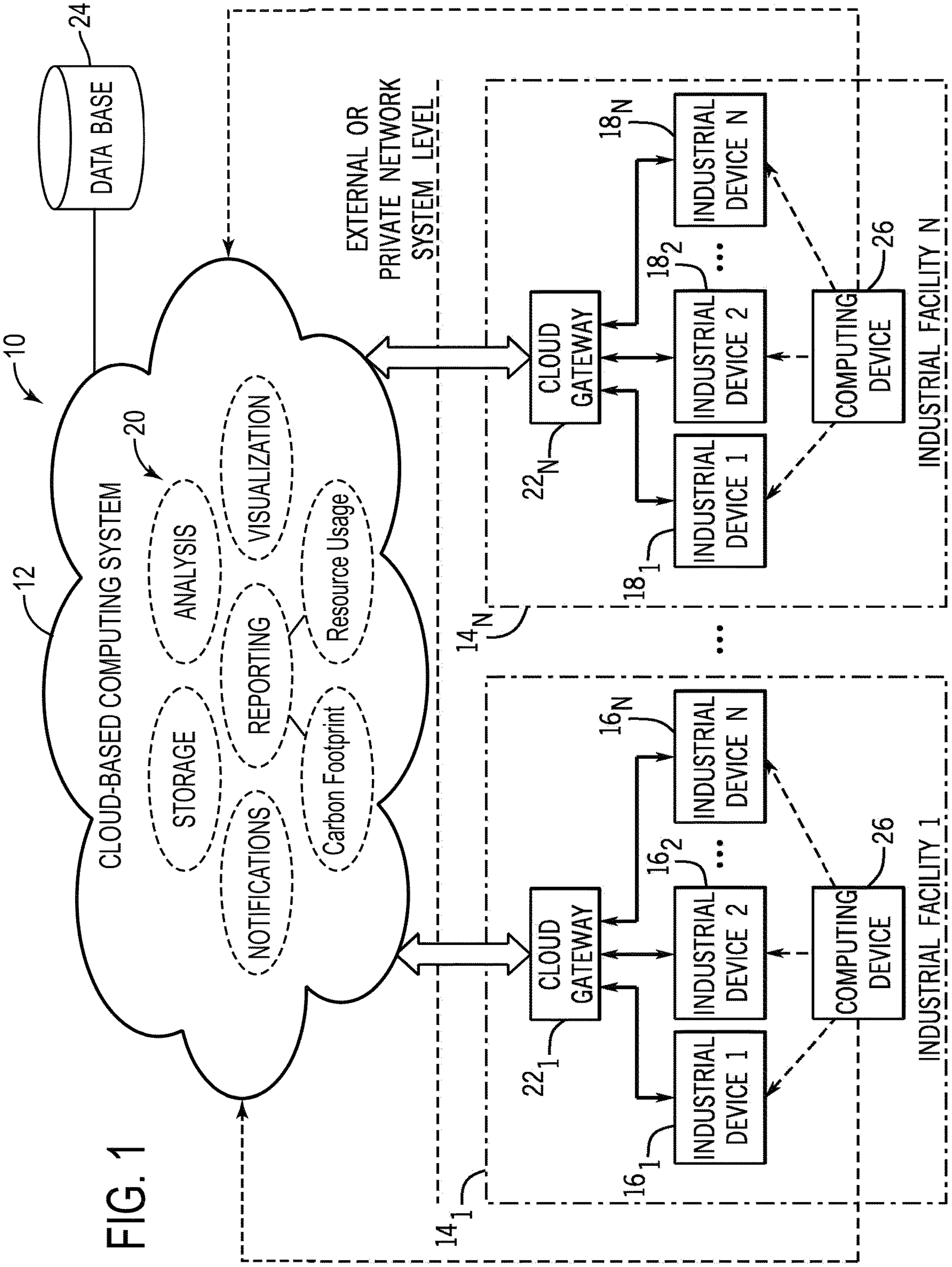
FIG. 1 illustrates a block diagram of a high-level overview of an industrial enterprise including a cloud-based computing system, according to some embodiments.

By way of introduction, FIG. 1 illustrates a high-level overview of an industrial enterprise such as a hydrocarbon site 10 that leverages a cloud-based computing system to improve the operations of various industrial devices. The enterprise or hydrocarbon site 10 may include one or more industrial facilities 14, each having a number of industrial devices 16 and 18 in use. The industrial devices 16 and 18 may make up one or more automation systems operating within the respective facilities 14. Exemplary automation systems may include, but are not limited to, batch control systems (e.g., mixing systems), continuous control systems (e.g., proportional-integral-derivative (PID) control systems), or discrete control systems. Industrial devices 16 and 18 may also include devices, such as industrial controllers (e.g., programmable logic controllers or other types of programmable automation controllers), field devices such as sensors and meters, motor drives, operator interfaces (e.g., human machine interfaces, industrial monitors, graphic terminals, message displays, etc.), industrial robots, barcode markers and readers, vision system devices (e.g., vision cameras), smart welders, or other such industrial devices.

In certain embodiments, the industrial devices 16 and 18 may be communicatively coupled to a computing device 26. The communication link between the industrial devices 16 and 18 and the computing device 26 may be a wired or a wireless connection, such as Wi-Fi®, Bluetooth®, MQTT®, and the like. Generally, the computing device 26 may be any type of processing device that may include communication abilities, processing abilities, and the like. For example, the computing device 26 may be a controller, such as a programmable logic controller (PLC), a programmable automation controller (PAC), or any other controller that may monitor, control, and operate the industrial device 16 and 18. The computing device 26 may be incorporated into any physical device (e.g., the industrial device 16 and 18) or may be implemented as a stand-alone computing device (e.g., general purpose computer), such as a desktop computer, a laptop computer, a tablet computer, a mobile computing device, or the like. Moreover, the communication data to and from the computing device 26 may include various safeguards to ensure privacy and security of the communication link (e.g., by encrypting the communication data, by requiring an authentication of a user before granting access to the communication data, by using a firewall to restrict access to the communication data, etc.)

In addition to communicating with the industrial devices 16 and 18, the computing device 26 may also establish a communication link with the cloud-based computing system 12. As such, the computing device 26 may have access to a number of cloud-based services provided by the cloud-based computing system 12, as will be described in more detail below. Generally, the computing device 26 may send and receive data to and from the cloud-based computing system 12 to assist a user of the industrial device 16 or 18 in the commissioning, operation, and maintenance of the industrial automation systems.

Exemplary automation systems can include one or more industrial controllers that facilitate monitoring and control of their respective processes and emissions. The controllers may exchange data with the field devices using native hardwired I/O or via a plant network such as Ethernet/IP, Data Highway Plus, ControlNet, DeviceNet, or the like. A given controller may receive any combination of digital or analog signals from the field devices indicating a current state of the devices, their associated processes, and uncertainty related thereto (e.g., temperature, position, on or off status, fluid level, etc.), and executes a user-defined control program that performs automated decision-making for the controlled processes based on the received signals. The controller may then output appropriate digital and/or analog control signaling to the field devices in accordance with the decisions made by the control program. These outputs may include device actuation signals, temperature or position control signals, operational commands to infield mechanical equipment, infield control signals, motion control signals, and the like. The control program may include any suitable type of code used to process input signals read into the controller and to control output signals generated by the controller, including but not limited to ladder logic, sequential function charts, function block diagrams, structured text, ISaGRAF®, or other such platforms.

Although the industrial enterprise or hydrocarbon site 10 illustrated in FIG. 1 depicts the industrial devices 16 and 18 as residing in fixed-location industrial facilities 14, the industrial devices 16 and 18 may also be part of a mobile control application, such as a system contained in a truck or other service vehicle. Additionally, although the industrial enterprise or hydrocarbon site 10 of FIG. 1 is described with respect to hydrocarbon production well sites, it should be noted that the systems and method for the industrial enterprise or hydrocarbon site 10 described herein may be applied to other automation systems.

In certain embodiments, the industrial devices 16 and 18 may be communicatively coupled to the cloud-based computing system 12 that may provide various applications, analysis operations, and access to data that may be unavailable to the industrial devices 16 and 18. The industrial devices can produce measurements and uncertainty values associated with the measurements. In some embodiments, the industrial device 16 and 18 may interact with the cloud-based computing system 12, such that the industrial device 16 and 18 may use various cloud-based services 20 to perform its respective operations more efficiently or effectively. The cloud-based computing system 12 may be any infrastructure that enables the cloud-based services 20 to be accessed and utilized by cloud-capable devices. In one embodiment, the cloud-based computing system 12 may include a number of computers that may be connected through a real-time communication network, such as the Internet, Ethernet/IP, ControlNet, or the like. By employing a number of computers, the cloud-based computing system 12 may distribute large-scale analysis operations over the number of computers that make up the cloud-based computing system 12.

Generally, the computers or computing devices provided by the cloud-based computing system 12 may be dedicated to performing various types of complex and time consuming analysis that may include analyzing a large amount of data. In some embodiments, the computers or computing devices provided by the cloud-based computing system 12 provide emissions reporting. The emissions reporting may include tracking carbon footprint (e.g., the amount of greenhouse gases generated over a time period, the amount of carbon dioxide and methane generated over a time period, the amount of emissions generated over a time period converted into a carbon dioxide equivalent, etc.) and energy usage (e.g., the amount of energy consumed over a time period, etc.). In some embodiments, the emissions reporting may include tracking the amount of carbon dioxide, methane, volatile organic compounds (VOCs), nitrogen oxides, sulfur oxides, and/or other emissions generated over a time period. In some embodiments, the emissions reporting can also provide production efficiency tracking. In some embodiments, the emissions reporting includes tracking energy usage against consents, chemical usage against constants, vent gas against consents, and emissions against carbon credits along with uncertainty values for each. Reports of mass carbon dioxide and associated uncertainty for streams and totals for stations can be provided as part of the carbon footprint and energy usage reporting. As a result, the industrial device 16 or 18 may continue its respective processing operations without performing additional processing or analysis operations that may involve analyzing large amounts of data collected from other data sources.

In certain embodiments, the cloud-based computing system 12 may be a public cloud accessible via the Internet by devices having Internet connectivity and appropriate authorizations to utilize the cloud-based services 20. In some scenarios, the cloud-based computing system 12 may be a platform-as-a-service (PaaS), and the cloud-based services 20 may reside and execute on the cloud-based computing system 12. In some embodiments, cloud-based computing system—is configured to provide, storage, notifications, reporting, visualization, and analysis of emissions and uncertainty.

Hydrocarbon Site

Figure 2:
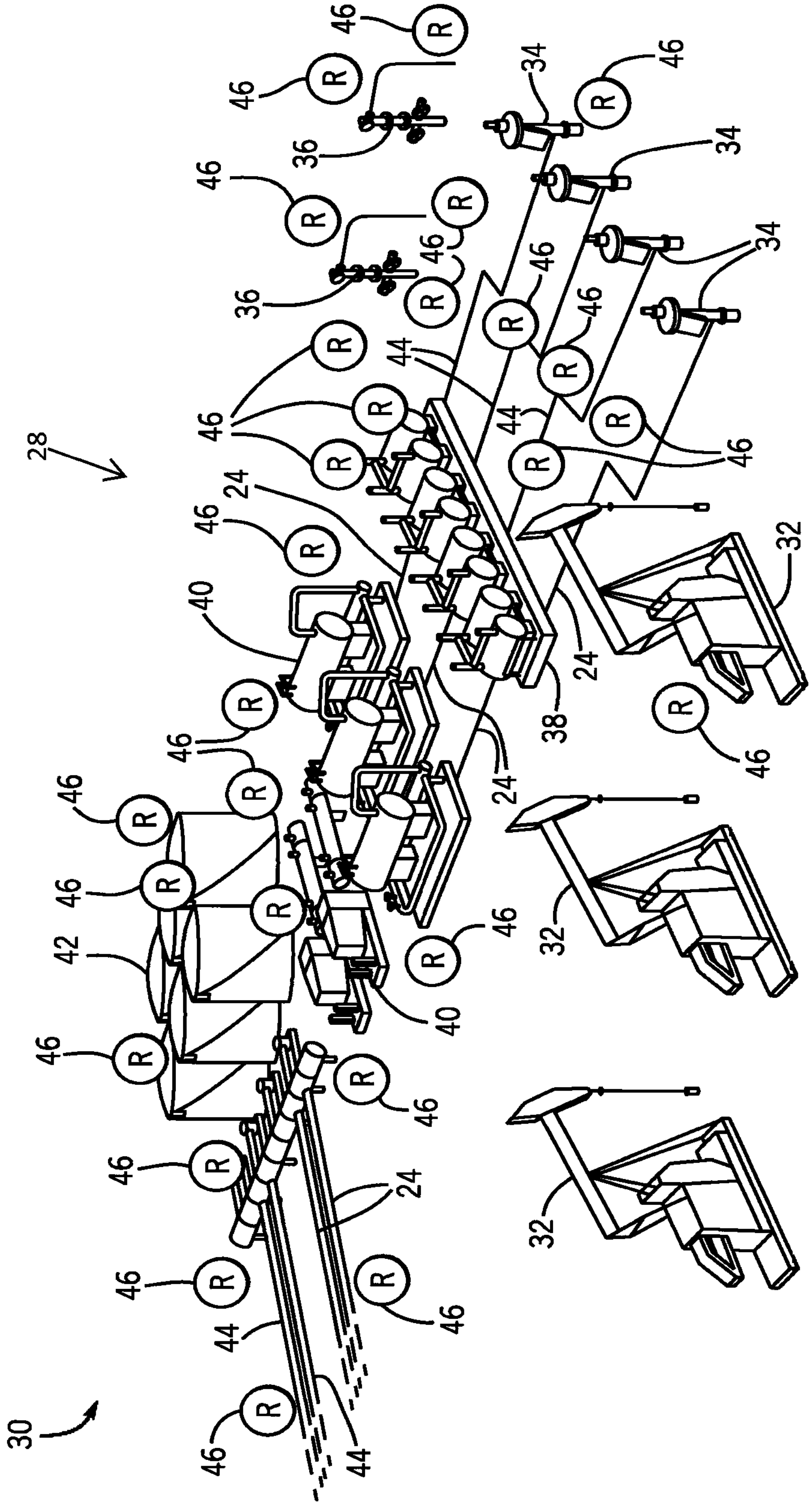
FIG. 2 illustrates a schematic diagram of an example hydrocarbon site that may produce and process hydrocarbons, according to some embodiments.

Referring now to FIG. 2, the hydrocarbon site 10 can be embodied as hydrocarbon site 30. Hydrocarbon site 30 is an area in which hydrocarbons, such as crude oil and natural gas, may be extracted from the ground, processed, and stored in some embodiments. As such, the hydrocarbon site 30 may include a number of well sites and a number of well devices, shown as well devices 28, that may control the flow of hydrocarbons being extracted from the well sites. In one embodiment, the well devices 28 at the hydrocarbon site 30 may include any device equipped to monitor and/or control production of hydrocarbons at the well sites. As such, the well devices 28 may include pumpjacks 32, submersible pumps 34, well trees 36, and the like. After the hydrocarbons are extracted from the surface via the well devices 28, the extracted hydrocarbons may be distributed to other devices such as wellhead distribution manifolds 38, separators 40, storage tanks 42, and the like. At the hydrocarbon site 30, the pumpjacks 32, submersible pumps 34, well trees 36, wellhead distribution manifolds 38, separators 40, and storage tanks 42 may be connected together via a network of pipelines 44. As such, hydrocarbons extracted from a reservoir may be transported to various locations at the hydrocarbon site 30 via the network of pipelines 44. Conduits used on hydrocarbon site 30 may include flow meters for providing flow measurements and uncertainty values for the flow measurements.

The pumpjack 32 may mechanically lift hydrocarbons (e.g., oil) out of a well when a bottom hole pressure of the well is not sufficient to extract the hydrocarbons to the surface. The submersible pump 34 may be an assembly that may be submerged in a hydrocarbon liquid that may be pumped. As such, the submersible pump 34 may include a hermetically sealed motor, such that liquids may not penetrate the seal into the motor. Further, the hermetically sealed motor may push hydrocarbons from underground areas or the reservoir to the surface.

[The well trees 36 or Christmas trees may be an assembly of valves, spools, and fittings used for natural flowing wells. As such, the well trees 36 may be used for an oil well, gas well, water injection well, water disposal well, gas injection well, condensate well, and the like. The wellhead distribution manifolds 38 may collect the hydrocarbons that may have been extracted by the pumpjacks 32, the submersible pumps 34, and the well trees 36, such that the collected hydrocarbons may be routed to various hydrocarbon processing or storage areas in the hydrocarbon site 30.

The separator 40 may include a pressure vessel that may separate well fluids produced from oil and gas wells into separate gas and liquid components. For example, the separator 40 may separate hydrocarbons extracted by the pumpjacks 32, the submersible pumps 34, or the well trees 36 into oil components, gas components, and water components. After the hydrocarbons have been separated, each separated component may be stored in a particular storage tank 42. The hydrocarbons stored in the storage tanks 42 may be transported via the pipelines 44 to transport vehicles, refineries, and the like. The well devices 28 can also include flaring and venting mechanisms such as systems for flaring and venting natural gas sources.

The well devices 28 may also include monitoring systems that may be placed at various locations in the hydrocarbon site 30 to monitor or provide information related to certain aspects of the hydrocarbon site 30. As such, the monitoring system may be a flow meter, temperature sensor, pressure sensor, composition analyzer, density analyzer, controller, a remote terminal unit (RTU), any computing device that may include communication abilities, processing abilities, sensor and the like. For discussion purposes, the monitoring system will be embodied as the RTU 46 throughout the present disclosure. However, it should be understood that the RTU 46 may be any component capable of monitoring and/or controlling various components at the hydrocarbon site 30.

The RTU 46 may include sensors or may be coupled to various sensors that may monitor various properties associated with a component (e.g., one of the well devices 28, etc.) at the hydrocarbon site 10. The RTU 46 may then analyze the various properties associated with the component and may control various operational parameters of the component. In some embodiments, the RTU 46 may include sensors or be coupled to various sensors that are temporarily associated with a component at the hydrocarbon site 10 (e.g., a drone inspecting the hydrocarbon site 30, a portable sensor used to inspect the hydrocarbon site 30, etc.). For example, the RTU 46 may measure a pressure or a differential pressure of a well or a component (e.g., storage tank 42) in the hydrocarbon site 30. The RTU 46 may also measure a temperature of contents stored inside a component in the hydrocarbon site 30, an amount of hydrocarbons being processed or extracted by components in the hydrocarbon site 30, and the like. The RTU 46 may also measure a level or amount of hydrocarbons stored in a component, such as the storage tank 42. In certain embodiments, the RTU 46 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-IO Flexible I/O Transmitter manufactured by Sensia LLC® of Houston, Texas.

In one embodiment, the RTU 46 may include a sensor that may measure pressure, temperature, fill level, flow rates, and the like. The RTU 46 may also include a transmitter, such as a radio wave transmitter, which may transmit data acquired by the sensor via an antenna or the like. The sensor in the RTU 46 may be wireless sensors that may be capable of receiving and sending data signals between computing device 26 (e.g., RTUs). To power the sensors and the transmitters, the RTU 46 may include a battery or may be coupled to a continuous power supply. Since the RTU 46 may be installed in harsh outdoor and/or explosion-hazardous environments, the RTU 46 may be enclosed in an explosion-proof container that may meet certain standards established by the National Electrical Manufacturer Association (NEMA) and the like, such as a NEMA 4X container, a NEMA 7X container, and the like.

The RTU 46 may transmit data acquired by the sensor or data processed by a processor to other monitoring systems, a router device, a supervisory control and data acquisition (SCADA) device, or the like. As such, the RTU 46 may enable users to monitor various properties of various components in the hydrocarbon site 30 without being physically located near the corresponding components.

In operation, the RTU 46 may receive real-time or near real-time data associated with one of the well devices 28. The data may include, for example, tubing head pressure, tubing head temperature, case head pressure, flowline pressure, wellhead pressure, wellhead temperature and the like. In any case, the RTU 46 may analyze the real-time data with respect to static data that may be stored in a memory of the RTU 46. The static data may include a well depth, a tubing length, a tubing size, a choke size, a reservoir pressure, a bottom hole temperature, well test data, fluid properties of the hydrocarbons being extracted, and the like. The RTU 46 may also analyze the real-time data with respect to other data acquired by various types of instruments (e.g., water cut meter, multiphase meter) to determine an inflow performance relationship (IPR) curve, a desired operating point for the wellhead or hydrocarbon site 30, key performance indicators (KPIs) associated with the wellhead or hydrocarbon site 30, wellhead performance summary reports, and the like. Although the RTU 46 may be capable of performing the above-referenced analyses, in some cases the RTU 46 may not be capable of performing the analyses in a timely manner due to the intensity of the above-referenced analyses and the limited processing power of the RTU 46.

In some embodiments, the RTU 46 may establish a communication link with the cloud-based computing system 12 described above. As such, the cloud-based computing system 12 may use its larger processing capabilities to analyze data acquired by multiple of the computing devices 26 (e.g., RTUs). Moreover, the cloud-based computing system 12 may access historical data associated with the respective RTU 46, data associated with well devices 28 associated with the respective RTU 46, data associated with the hydrocarbon site 30 associated with the respective RTU 46 and the like to further analyze the data acquired by the RTU 46.

Figure 3:
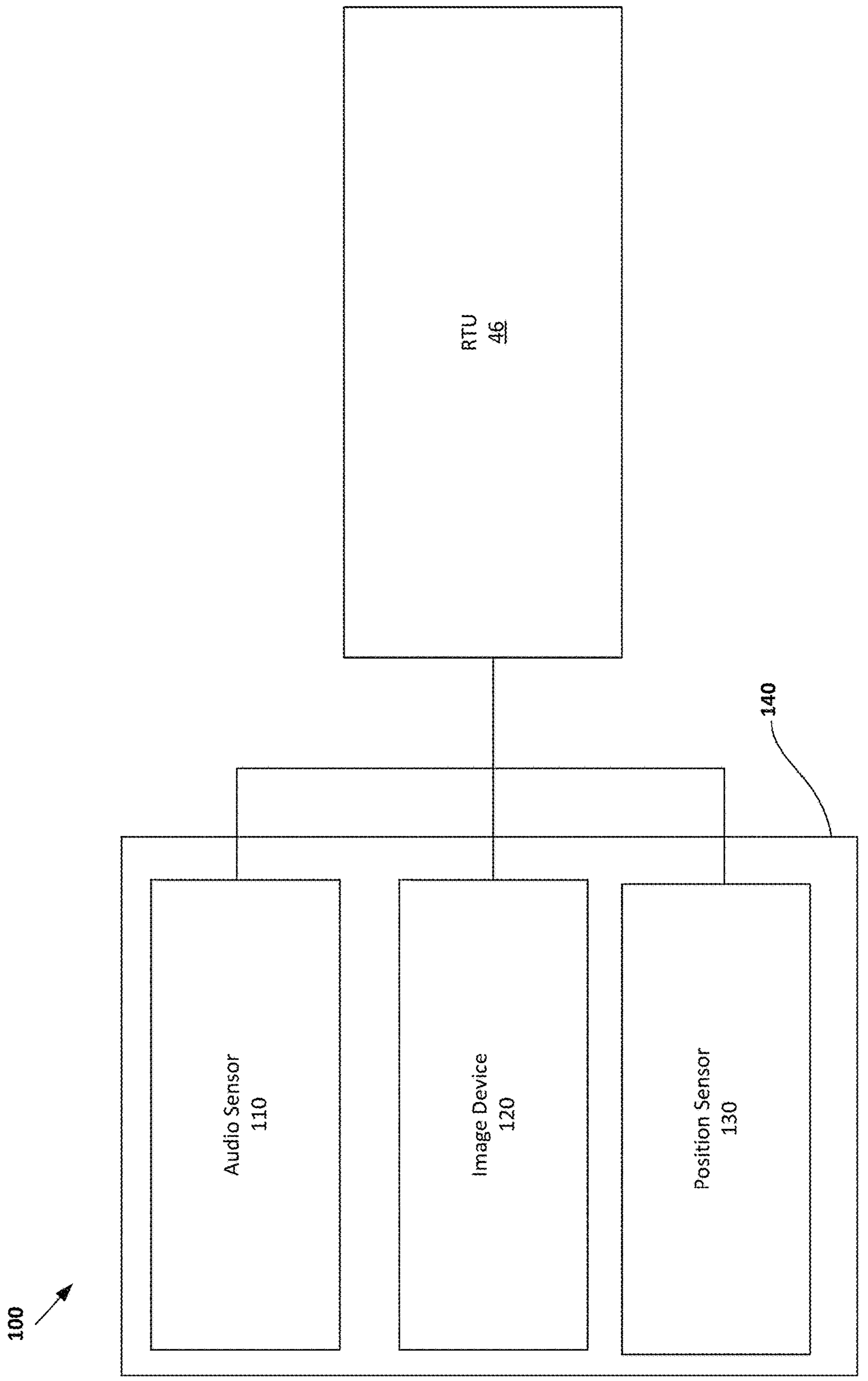
FIG. 3 illustrates a schematic diagram of an example sensor array system that may generate sensor data associated with the hydrocarbon site of FIG. 2, according to some embodiments.

Accordingly, in one embodiment, the RTU 46 may communicatively couple to the cloud-based computing system 12 via a cloud-based communication architecture or services 20 as shown in FIG. 3. Referring to FIG. 3, the RTU 46 is communicatively coupled to a control engine 52 such as ControlLogix® or the like. The control engine 52 may, in turn, communicatively couple to a communication link 54 that may provide a protocol or specifications such as OPC Data Access that may enable the control engine 52 and the RTU 46 to continuously communicate its data to the cloud-based computing system 12 or computing device 26. The communication link 54 may be communicatively coupled to the cloud gateway 22, which may then provide the control engine 52 and the RTU 46 access to communicate with the cloud-based computing system 12. Although the RTU 46 is described as communicating with the cloud-based computing system 12 via the control engine 52 and the communication link 54, it should be noted that in some embodiments, the RTU 46 may communicate directly with the cloud gateway 22 like the industrial device 16 and 18 of FIG. 1 or may communicate directly with the cloud-based computing system 12.

In some embodiments, the computing device 26 (e.g., RTU) may communicatively couple to the control engine 52 or the communication link 54 via an Ethernet IP/Modbus network. As such, a polling engine may connect to the computing device 26 (e.g., RTU) via the Ethernet IP/Modbus network to poll the data acquired by the computing device 26 (e.g., RTU). The polling engine may then use an Ethernet network to connect to the cloud-based computing system 12.

Sensor Array System

Figure 4:
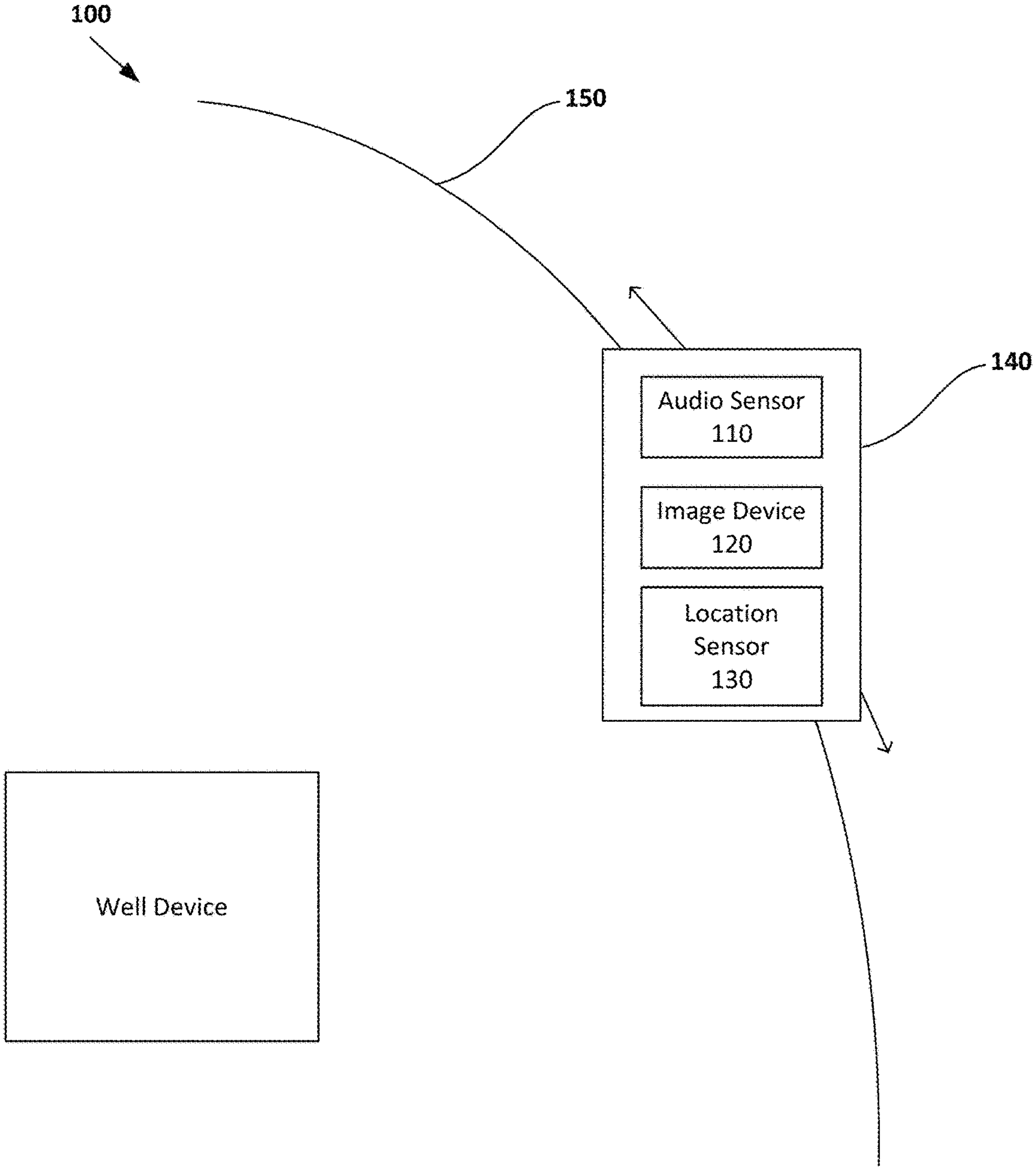
FIG. 4 illustrates another schematic diagram of the sensor array system of FIG. 3, according to some embodiments.

As shown in FIGS. 3 and 4, a sensor array system 100 (e.g., a sensor system, a sensor array, etc.) includes an audio sensor 110 (e.g., a microphone, an audio recorder, etc.) communicably coupled to the RTU 46. The audio sensor 110 is configured to generate audio data associated with at least one of the well devices 28 of the hydrocarbon site 30, according to some embodiments. The RTU 46 may obtain the audio data from the audio sensor 110 and then analyze the audio data associated with the well devices 28 and may identify an operational profile (e.g., issues, problems, unexpected properties, operational attributes, etc.) associated with operation of the well devices 28 and/or control various operation parameters of the well devices 28 based on the audio data. For example, the audio sensor 110 may be a microphone that is directed toward the well device 28 to record the audio data corresponding to sound (e.g., noise, soundwaves, etc.) emitted by the well devices 28. In other embodiments, the RTU 46 includes the audio sensor 110.

In various embodiments, the sensor array system 100 includes a plurality of the audio sensors 110 (e.g., an array of the audio sensors 110, etc.) configured to generate audio data associated with at least one of the well devices 28 of the hydrocarbon site 30. For example, the sensor array system 100 may include multiple of the audio sensors 110 configured to generate the audio data associated with one of the well devices 28. As another example, the sensor array system 100 may include multiple of the audio sensors 110 each configured to generate audio data associated with one of the well devices 28 of the hydrocarbon site 30 (e.g., one of the audio sensors 110 for each of the well devices 28, etc.). The multiple of the audio sensors 110 may allow to the audio data generated by the multiple of the audio sensors 110 to be used to determine a directionality of the sounds received by the multiple of the audio sensors 110 (e.g., based on different sounds being received by different of the audio sensors 110 at different moments, etc.).

According to an exemplary embodiment, the audio sensor 110 is positioned remote (e.g., isolated, detached, etc.) from the well devices 28. For example, the audio sensor 110 may be positioned on an audio array (e.g., an array of the audio sensors 110, etc.) that are positioned at a distance (e.g., a distance greater than zero, etc.) away from the well devices 28. As a result, the audio sensor 110 may be used to monitor the operation of the well devices 28 by generating the audio data without being positioned on the well devices 28 and/or being incorporated into the well devices 28 (e.g., coupled to a housing of the well devices 28, coupled to the well devices 28, etc.). Advantageously, positioning the audio sensors 110 remote from the well devices 28 may allow for the audio sensors 110 to be installed (e.g., placed, planted, etc.) retroactively (e.g., after an initial installation of the well device 28, etc.) to monitor the well devices 28 without direct interface with the well devices 28. Additionally, positioning the audio sensors 110 remote from the well devices 28 may allow for the audio sensors 110 to monitor the well devices 28 that are typically inaccessible (e.g., well devices 28 that cannot be directly monitored, etc.). For example, the audio sensors 110 may be configured to generate audio data associated with flow of hydrocarbons through an inner bore of the well tree 36.

In some embodiments, the audio sensor 110 is a directional microphone that is configured to receive sound waves from a specific direction and generate the audio data corresponding to the sound waves received from the specific direction. For example, the audio sensor 110 configured as the directional microphone may be oriented toward a first of the well devices 28 and away from a second of the well devices 28 such that the audio sensor 110 generates the audio data corresponding to first sounds generated by the first of the well devices 28 and does not generate the audio data to correspond to second sounds generated by the second of the well devices 28. As a result, an orientation of the audio sensor 110 may be modified (e.g., changed, turned, etc.) based on which of the well devices 28 that the audio data should correspond to. For example, if an operator desires to receive audio data corresponding to a first of the well devices 28 instead of a second of the well devices 28, the audio sensor 110 may be oriented toward the first of the well devices 28 and/or away from the second of the well devices 28 such that the audio data generated by the audio sensor 110 corresponds to sounds generated by the first of the well devices 28 instead of the second of the well devices 28.

In some embodiments, the audio sensor 110 has a narrow frequency bandwidth such that the audio generated by the audio sensor 110 corresponds to sounds received by the audio sensor 110 that are within a specific frequency range. The audio sensor 110 may have a notched bandwidth. For example, if the audio sensor 110 is being used to generate audio data corresponding to a gearbox of a motor of the submersible pump 34, the audio sensor 110 may be configured to have a narrow bandwidth that corresponds to a specific frequency range that includes frequencies of sounds that are typically generated by gears grinding together such that the audio data generated by the audio sensor 110 includes sounds that may be the gears of the motor of the submersible pump 34 grinding together. As another example, if the audio sensor 110 is being used to monitor the separator 40, the audio sensor 110 may be configured to have a narrow bandwidth that corresponds to a specific frequency range that includes frequencies of sounds that are typically generated by a gas leaking through a hole such that the audio data generated by the audio sensor includes sounds that may be gas leaking from the separator 40. In other embodiments, the audio sensor 110 has a high bandwidth such that the audio data generated by the audio sensor 110 corresponds to a majority of the sounds received by the audio sensor 110.

As shown in FIGS. 3 and 4, the sensor array system 100 includes an image sensor 120 (e.g., a camera, an infrared camera, an ultrasonic sensor, a video camera, etc.) communicably coupled to the RTU 46. The image sensor 120 is configured to generate image data associated with at least one of the well devices 28 of the hydrocarbon site 30, according to some embodiments. The RTU 46 may obtain the image data from the image sensor 120 and then analyze the image data associated with the well devices 28 and may identify operational profiles associated with the operation of the well devices 28 and/or control various operation parameters of the well devices 28 based on the image data. For example, the image sensor 120 may be a camera that is directed toward the well device 28 to record the image data corresponding to images taken by the camera of the well devices 28 and/or surrounding of the well devices 28. The image sensor 120 may be configured to generate the image data associated with the same of the well devices 28 as the audio sensor 110 or a different of the well devices 28 as the audio sensor 110.

In various embodiments, the sensor array system 100 includes or is coupled to a plurality of the image sensors 120 (e.g., an array of the image sensors 120, etc.) configured to generate image data associated with at least one of the well devices 28 of the hydrocarbon site 30. For example, the sensor array system 100 may include multiple of the image sensors 120 configured to generate the image data associated with one of the well devices 28. As another example, the sensor array system 100 may include multiple of the image sensors 120 each configured to generate image data associated with one of the well devices 28 of the hydrocarbon site 30 (e.g., one of the image sensors 120 for each of the well devices 28, etc.). The multiple of the image sensors 120 may allow for the image data generated by the multiple of the image sensors 120 to be used to determine distances of objects away from the image sensors 120 (e.g., based on a difference of the depth of the objects in a first portion of the image data generated by a first of the image sensors 120 and a second portion of the image data generated by a second of the image sensors 120, etc.).

According to an exemplary embodiment, the image sensor 120 is positioned remote from the well devices 28. For example, the image sensor 120 may be positioned on a camera array (e.g., an array of the image sensors 120, etc.) that are positioned at a distance (e.g., a distance greater than zero, etc.) away from the well devices 28. As a result, the image sensor 120 may be used to monitor the operation of the well devices 28 by generating the image data without being positioned on the well devices 28 and/or being incorporated into the well devices 28. Advantageously, positioning the image sensors 120 remote from the well devices 28 may allow for the image sensors to be installed retroactively to monitor the well devices 28 without requiring interface with the well devices 28. Additionally, positioning the image sensors 120 remote from the well devices 28 may allow for the image sensors 120 to monitor the well devices 28 that are typically inaccessible.

As shown in FIGS. 3 and 4, the sensor array system 100 includes a sensor housing 140 (e.g., a sensor array, a combined sensor housing, etc.) configured to receive the audio sensor 110 and the image sensor 120. The sensor housing 140 may be positioned remote from the well device 28 such that the audio sensor 110 and the image sensor 120 are positioned remote from the well device 28 at a same location as each other. In some embodiments, the sensor housing 140 may be configured to shield the audio sensor 110 and/or the image sensor 120 from hazardous conditions associated with the hydrocarbon site 30 (e.g., conditions that may damage the audio sensor 110 and/or the image sensor 120, etc.).

In some embodiments, the image sensor 120 is configured as an infrared image sensor (e.g., a thermal sensor, a thermal camera, etc.) that is configured to generate image data associated with infrared wavelengths. For example, when the image sensor 120 is configured to generate image data corresponding to the storage tank 42, the image sensor 120 may generate infrared image data associated with the storage tank 42 such that a tank level of fluid stored in the storage tank 42 can be identified based on changes in surface temperature across an outer surface of the storage tank 42. As another example, when the image sensor 120 is configured to generate image data corresponding to a motor, the image sensor 120 may generate infrared image data associated with the motor such that that hot spots within the motor can be identified.

In some embodiments, the image sensor 120 is configured as an ultrasonic image sensor (e.g., an ultrasonic sensor, an ultrasonic camera, etc.) that is configured to generate image data associated with ultrasonic signals emitted by the image sensor 120. For example, when the image sensor 120 is configured to generate image data associated with the well tree 36, the image sensor 120 may emit ultrasonic signals toward the well tree 36 and generate the image data based on the ultrasonic signals the reflect off of the well tree 36 back to the image sensor 120.

As shown in FIGS. 3 and 4, the sensor array system 100 includes a position sensor 130 configured to generate positional data associated with at least one of the sensor array system 100, the audio sensor 110, or the image sensor 120, according to some embodiments. The RTU 46 may obtain the positional data and then analyze the positional data to determine a position of the at least one of the sensor array system 100, the audio sensor 110, or the image sensor 120. In some embodiments, the RTU 46 may determine an identification of the well device 28 being monitored by the sensor array system 100 based on the positional data. For example, the RTU 46 may compare the positional data with positions of well devices 28 of the hydrocarbon site 30 and determine the well device 28 being monitored by the sensor array system 100 based on a proximity between the position of the positional data and the positions of the well devices 28. In some embodiments, the positional data includes an orientation (e.g., directionality, etc.) of the audio sensor 110 or the image sensor 120 and the RTU 46 determines the well device 28 being monitored by the sensor array system 100 based on the orientation of the audio sensor 110 or the image sensor 120. For example, when the positional data indicates that the image sensor 120 is oriented towards one of the well devices 28, the RTU 46 may determine that the image sensor 120 is monitoring the one of the well devices 28. In some embodiments, the RTU 46 associates the image data received from the image sensor 120 and/or the audio data received from the audio sensor 110 with well devices 28 of the hydrocarbon site 30 based on the positional data received from the position sensor 130.

According to the exemplary embodiment shown in FIG. 4, the audio sensor 110, the image sensor 120, and the position sensor 130 are coupled to the sensor housing 140 that is configured to slide along a track 150, according to some embodiments. As the sensor housing 140 slides along the track 150, the position sensor 130 may generate the positional data corresponding to different positions of the audio sensor 110 and the image sensor 120 along the track 150, the audio sensor 110 may generate audio data corresponding to sounds received by the audio sensor 110 at the different positions of the audio sensor 110 along the track 150, and/or the image sensor 120 may generate image data corresponding to images recorded by the image sensor 120 at the different positions of the image sensor 120 along the track 150. By moving the audio sensor 110 and/or the image sensor 120 along the track 150, the audio data and/or the image data generated by the audio sensor 110 and/or the image sensor 120 may correspond to the sounds received by the audio sensor 110 and/or the images recorded by the image sensor 120 at the different positions along the track 150 and may be used to reveal additional information corresponding to the well devices 28 based on the changing directionality between the well device 28 and the audio sensor 110 and/or the image sensor 120.

Operational Profile Identification System

Figure 5:
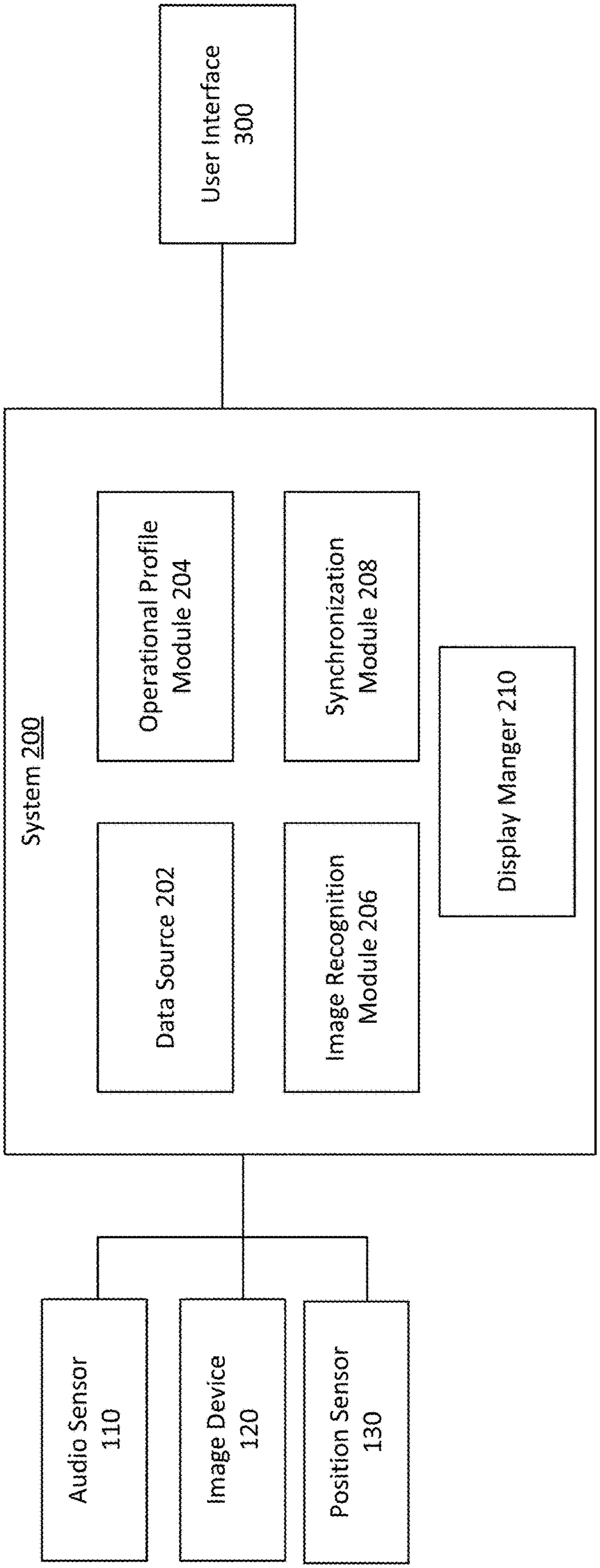
FIG. 5 illustrates a schematic diagram of a system configured to determine operational profiles of industrial equipment based on sensor data, according to some embodiments.

With reference to FIG. 5, a system 200 can be configured to receive sensor data associated with a well device from the sensors of the sensor array system 100 and generate operational data (e.g., operational attributes, performance attributes, performance identifiers, operational scores, etc.) associated with operation of the well device. For example, the system 200 can receive audio data from the audio sensor 110 of the sensor array system 100 associated with an operation of one of the separators 40 and generate operational data corresponding to the operation of the one of the separators 40 based on the audio data. In some embodiments, the system 200 can be implemented by the RTU 46 to generate the operational data associated with the well device based on the sensor data received from the sensor array system 100. In other embodiments, the system 200 is at least partially implemented by the cloud-based computing system 12. For example, when the RTU 46 does not include sufficient processing power to generate the operational data based on the sensor data received from the sensor array system 100, the RTU 46 may provide at least a portion of the sensor data to the cloud-based computing system 12 to implement the system 200. As another example, when the RTU 46 receives the image data from the image sensor 120 of the sensor array system 100, the RTU 46 may not include sufficient processing power to perform image recognition techniques that may be implemented in order to generate the operational data based on the image data. As a result, the RTU 46 may provide the image data to the cloud-based computing system 12 to utilize the system 200 to generate the operational data based on the image data. Advantageously, system 200 can allow for operators to determine operational data associated with the operation of well devices based on the sensor data generated by the sensor array system 100. In some embodiments, applying system 200 can allow for operators to determine the operational data without directly interfacing with the well devices (e.g., when the sensor array system 100 is positioned remote of the well device, etc.). In other embodiments, system 200 can be configured to generate operational data associated with operation of industrial devices of other industrial sites based on sensor data received from the sensor array system 100 (e.g., refineries, power plants, etc.).

As shown in FIG. 5, the system 200 may be communicably coupled to one or more user interfaces 300. The user interface 300 can be an interface, HDMI interface, a screen, mobile device, etc., that provides supervisory control and user interaction capabilities to a user associated with the RTU 46 and/or the well devices 28 of the hydrocarbon site 30. For example, the user interface 300 can be a touch screen mounted to the RTU 46 and allow for user input and control. In other embodiments, the user interface 300 is coupled to the cloud-based computing system 12. In this case, the user interface 300 can allow for remote monitoring and control of the well device 28. The user interface 300 can receive text, video, and/or image input.

As shown in FIG. 5, the system 200 includes one or more data sources 202. The data sources 202 can include any of various databases, data sets, or data repositories, for example. The data source 202 can be maintained by one or more entities, which may be entities that maintain the system 200 or may be separate from entities that maintain the system 200. For example, the data source 202 can be the data base 24 that is maintained by the cloud-based computing system 12. The data source 202 can receive data from the user, third parties, the RTUs 46, and/or the cloud-based computing system 12. The data source 202 can include historical sensor data associated with historical operations of the well devices 28 and/or the hydrocarbon site 30, historical operation data, benchmark data, operational procedures, and operational thresholds, and/or other data.

As shown in FIG. 5, the system 200 includes an operational profile module 204 configured to receive sensor data associated with operation of a well device and generate operational data based on the sensor data that corresponds to operational profiles of the operation of the well devices. For example, the operational profile module 204 may receive the sensor data associated with the operation of the well device 28 from the sensor array system 100 and generate the operational data based on the sensor data. As another example, the operational profile module 204 may receive at least one of the audio data from the audio sensor 110 or the image data from the image sensor 120 and generate the operational data based on the audio data and/or the image data. In some embodiments, the operational profile of the operational data generated by the operational profile module 204 is associated with a classification of the operation of the well device 28. The operational profile may be a model and/or a description relating to the operation of the well device 28. The operational profile may include information associated with a frequency of operation of the well device 28, a workload intensity of the well device 28, an operating environment of the well device 28, an operational phase of the well device 28 (e.g., startup, shutdown, peak operation, etc.), an efficiency of the well device 28, etc. For example, the operational profile may be utilized to classify the operation of the well device 28 as a normal operation or an abnormal operation. As another example, the operational profile may be utilized to classify a maintenance state of the well device 28 (e.g., needs maintenance, does not need maintenance, will need maintenance by a certain date, etc.).

In some embodiments, the operational profile module 204 is configured to receive sensor data associated with operation of a flare of the hydrocarbon site 30 and generate operational data based on the sensor data that correspond to operational profiles of the operation of the flare. For example, the operational profile module 204 may receive image data corresponding to the operation of the flare from the image sensor 120 of the sensor array system 100 and generate the operational data based on the image data. The image data may include infrared images of a flame outputted by the flare and the operational profile module 204 may generate the operational data based on the infrared images. For example, the operational profile module 204 may determine that the flaring operation of the flare is associated with a starved operational profile when the image data indicates that the flame of the flare is below a height threshold.

In some embodiments, the operational profile module 204 is configured to receive sensor data associated with fluid levels in the well device 28 and generate operational data based on the sensor data that correspond to operational profiles of the operation of the well device 28. By way of example, the operational profile module 204 may receive audio data corresponding to a fluid level in a well tree 36 of the hydrocarbon site 30 (e.g., a fluid level at the surface, etc.) and generate the operational data based on the audio data. The audio data may include different audio profiles based on the conditions of the fluid in the well. By way of example, the audio data may include a first audio profile associated with normal operation of the well tree 36, a second audio profile associated with starved operation of the well tree 36 (e.g., a low fluid level, etc.), and a third audio profile associated with overflow operation of the well tree 36 (e.g., a high fluid level, etc.). As a result, the operational data may be associated with a normal operational profile when the audio data includes the first audio profile, a low flow operational profile when the audio data includes the second audio profile, or a high flow operational profile when the audio data includes the third audio profile.

In some embodiments, the operational data generated by the operational profile module 204 corresponds to operational profiles that are associated with failure modes of the well device 28. For example, when the operational data corresponds with the operation of the pumpjack 32, the operation data may correspond to an operational profile that is associated with a failure of a bearing of the pumpjack 32 (e.g., a pivot bearing of the pumpjack 32, etc.). As another example, when the operational data corresponds with the operation of the storage tank 42, the operational data may correspond to an operational profile that is associated with a containment failure of the storage tank 42 that may result in fluids leaking from the storage tank 42. In some embodiments, the operational profiles associated with the failure modes include failure timeline associated with the failure modes. For example, regarding the failure of the bearing of the pumpjack 32, the operational profile may indicate that the bearing will fail in two months if it is not serviced. As another example, regarding the containment failure of the storage tank 42, the operational profile may indicate that the storage tank 42 will leak in approximately ten days if a temperature of the fluid contained in the storage tank 42 is not reduced. In some embodiments, the operational profile module 204 is configured to update the failure modes included in the operational profile based on additional sensor data received from the sensor array system 100 and/or from an operator of the well device 28. For example, if the audio data corresponding to the well device 28 changes over time indicating that the well device 28 will fail more rapidly than originally estimated, the operational profile module 204 may update the operational data to reflect the changes in the failure mode.

In some embodiments, the operational profile module 204 is configured to generate the operational data corresponding to the operation of the well device 28 based on both the image data corresponding to the well device 28 received from the image sensor 120 and the audio data corresponding to the well device 28 received from the audio sensor 110. For example, the operational profile module 204 may generate operational data indicating that a gear box of the well device 28 is overheating based on the audio data including a sound profile that is indicative of insufficient lubricant in a gearbox and the image data including a temperature profile on an outside surface of the gearbox that is higher than during normal operation. As another example, the operational profile module 204 may generate operational data indicating that a slug is traveling along one of the pipelines 44 based on the audio data including a sounds profile that is indicative of a viscous fluid traveling through a pipeline and the image data including a temperature profile moving along the one of the pipelines 44 when the temperature of the slug is higher than a remainder of the fluid traveling through the one of the pipelines 44.

In some embodiments, the operational profile module 204 is configured to generate the operational data based on the image data or the audio data and verify the operational data based on the other of the image data or the audio data. For example, the operational profile module 204 may receive the image data and the audio data from the sensor array system 100, generate the operational data corresponding to the operation of the well device 28 based on the image data, and then verify the operational data using the audio data. As anther example, the operational profile module 204 may receive the image data and the audio data from the sensor array system 100, generate the operational data corresponding to the operation of the well device 28 based on the audio data, and then verify the operational data using the image data.

In some embodiments, the operational profile module 204 is configured to request additional sensor data corresponding to the well device 28 from the sensor array system 100 based on the sensor data corresponding to the well device 28 received from the sensor array system 100. In some embodiments, the operational profile module 204 is configured to request image data corresponding to the well device 28 from the sensor array system 100 based on the audio data corresponding to the well device 28 received from the sensor array system 100. For example, the operational profile module 204 may receive audio data corresponding to operation of one of the pumpjacks 32 that includes a sound profile indicative of friction in the one of the pumpjacks 32 (e.g., a squeaky sound profile, a whiny sound profile, a grinding sound profile, etc.). In response, the operational profile module 204 may request and/or obtain image data corresponding to the one of the pumpjacks 32 from the sensor array system 100 such that the operational profile module 204 may generate the operational data corresponding to the one of the pumpjacks 32 based on the audio data and the image data. Advantageously, by configuring the operational profile module 204 to request the image data after already receiving and analyzing the audio data and determining that the image data is needed to generate the operational data, an amount of data transferred from the sensor array system 100 to the operational profile module 204 may be reduced, allowing for additional data to be transferred between the sensor array system 100 and the operational profile module 204 that may not otherwise be possible. Specifically, since the audio data generated by the audio sensor 110 is typically a smaller amount of data compared to the image data generated by the image sensor 120, a reduction in an amount of image data transferred from the sensor array system 100 to the operational profile module 204 may significantly reduce the amount of data transferred from the sensor array system 100 to the operational profile module 204. In other embodiments, the operational profile module 204 is configured to request audio data corresponding to the well device 28 from the sensor array system 100 based on the image data corresponding to the well device 28 received from the sensor array system 100.

In some embodiments, the operational profile module 204 is configured to perform additional analysis (e.g., analyze every image frame included in the image data when the initial analyze only include analyzing a portion of the image frames, etc.) on the sensor data based on the operational data generated by the operational profile module 204. For example, if the operational data generated by the operational profile module 204 corresponds to a gas leak from the well device 28, the operational profile module 204 may perform additional analysis on the sensor data to determine additional information associated with the operational data (e.g., enhanced operational data, etc.). As another example, if the operational profile module 204 determined the operational profile of the operation of the well device 28 corresponds to the gas leak based on analyzing a visible spectrum of the image data received from the image sensor 120, the operational profile module 204 may further analyze an infrared spectrum of the image data received from the image sensor 120 to determine the additional information associated with the operational data. Once the further analysis has been performed, the operational profile module 204 may update the operational data to include the additional information. In some embodiments, the additional analysis performed by the operational profile module 204 is analysis that requires more processing power than the analysis performed by the operational profile module 204 to generate the operational data. As a result, the operational profile module 204 may utilize less processing power by performing the additional analysis on the sensor data after the analysis performed by the operational profile module 204 to generate the operational data indicates that additional analysis may be beneficial (e.g., may increase the accuracy of the operational data, may clarify the operational data, may reduce an error in the operational data, etc.).

In some embodiments, the operational profile module 204 utilizes data received from the data source 202 to generate the operational data. For example, the operational profile module 204 may receive the sensor data from the sensor array system 100 corresponding to the operation of the well device 28 and historical sensor data (e.g., previous sensor data, sensor data recorded during a previous timeframe, etc.) from the data source 202 corresponding to historical operation of the well device 28 (e.g., operation of the well device 28 in a past time frame, etc.). The operational profile module 204 may compare the sensor data from the sensor array system 100 with the historical sensor data from the data source 202 to determine the operational profile associated with the operation of the well device 28. The historical sensor data may have been generated by the sensor array system 100 during the previous timeframe or may have been generated by a different sensor system (e.g., other than the sensor array system 100, etc.) during the previous timeframe. As another example, the operational profile module 204 may receive the sensor data from the sensor array system 100 corresponding to the operation of the well device 28 and calibration data (e.g., test data, etc.) associated with calibration operations of the well device 28. The operational profile module 204 may compare the sensor data from the sensor array system 100 with the calibration data from the data source 202 to determine the operational profile associated with the operation of the well device 28.

As shown in FIG. 5, the system 200 includes an image recognition module 206 configured to implement image recognition methodology (e.g., a neural network, machine learning, artificial intelligence, etc.) to determine image parameters associated with image data. The operational profile module 204 may provide the image data received from the image sensor 120 of the sensor array system 100 to the image recognition module 206 and receive image parameters associated with the image data that the operational profile module 204 may utilize to generate the operational data associated with the operational profile of the operation of the well device 28. For example, the image recognition module 206 may use image recognition methodology to identify an object included in the image data and determine the image parameters associated with the image data based on the identification of the object. As another example, the image recognition module 206 may use image recognition methodology to identify movement of an object included in the image data and determine the image parameters associated with the image data based on the movement of the object. In some embodiments, the image recognition module 206 utilizes data received from the data sources 202 when determining the image parameters associated with the image data. For example, the image recognition module 206 may compare the image data with reference data received from the data sources 202 that includes predetermined objects, predetermined labels, and/or predetermined parameters and may generate the image parameters based on matches between the image data and the reference data.

As shown in FIG. 5, the system 200 includes a synchronization module 208 configured to synchronize sensor data received by the system 200. The operational profile module 204 may provide the sensor data received by the system 200 to the synchronization module 208 to synchronize the sensor data prior to generating the operational data associated with the well device 28. For example, the audio sensor 110 may include a first microcontroller (e.g., controller, etc.) that applies a first timestamp on the audio data generated by the audio sensor 110 before providing the audio data to the RTU 46 and the image sensor 120 may include a second microcontroller that applies a second timestamp on the image data generated by the image sensor 120 before providing the image data to the RTU 46. However, the first timestamp and the second timestamp may be offset from each other (e.g., an error may exist between the first timestamp and the second time stamp, etc.). As a result, if the operational profile module 204 compares the image data at a first moment of time based on the first time stamp and the audio data at the first moment of time based on second time stamp, one of the image data or the audio data may not actually correspond with the first moment of time. Therefore, the operational profile module 204 may provide the sensor data received from the sensor array system 100 to synchronize the sensor data prior to the operational profile module 204 generating the operational data corresponding to the operational profile such that the sensor data from each of the sensors of the sensor array system 100 is being analyzed by the operational profile module 204 for the same time frames.

In some embodiments, the synchronization module 208 synchronizes the sensor data received by the system 200 by comparing timestamps associated with the sensor data and detecting errors associated with the timestamps using a timestamp correction algorithm. The timestep correction algorithm may utilize data analysis techniques such as linear regression based techniques to align the timestamps associated with the sensor data based on expected sensor data, such as an assumption that the timestamps associated with the sensor data should increment or increase at a constant rate. As a result, if one of the sensors of the sensor array system 100 begins to drift (e.g., an incremental rate of the timestamps associated with the sensor data received from the one of the sensors increases or decreases, etc.) the synchronization module 208 may correct the timestamps such that the operational profile module 204 may accurately generate the operational data associated with the operational profile of the operation of the well device 28 based on the sensor data. In various embodiments, the synchronization module 208 synchronizes the sensor data received by the system 200 to adjust for error caused by the sensor array system 100 being positioned remote from the well device 28. For example, since the audio sensor 110 and the image sensor 120 are positioned a distance away from the well device, light received by the image sensor 120 may reach the image sensor 120 faster than sound waves received by the audio sensor 110 (e.g., due to a relative difference between the speed of sound and the speed of light, etc.). The synchronization module 208 may adjust the sensor data such that the image data and the audio data align based on a time frame when the light received by the image sensor 120 is emitted from the well device 28 and when the sound waves received by the audio sensor 110 are emitted from the well device 28.

In some embodiments, the synchronization module 208 is configured to synchronize the sensor data received by the system 200 by transforming the sensor data from a time domain to a frequency domain. For example, the synchronization module 208 may convert the audio data received from the audio sensor 110 from the time domain to the frequency domain and then align the sensor data in the frequency domain in order to synchronize the sensor data.

As shown in FIG. 5, the system 200 includes a display manager 210 (e.g., a content control circuit, etc.) configured to generate content for outputting to users. The content can be generated based on data from various resources (e.g., the sensor array system 100, the data source 202, the operational profile module 204, etc.). In some embodiments, the display manager 210 is configured to provide content to the user interface 300 for display to the users (e.g., through a wired connection, wirelessly, etc.). In some embodiments, the display manager 210 is configured to provide content to the user interface 300 for audio output to the user (e.g., based on the audio data, etc.). The content can include actionable items that the user may select or otherwise manipulate. The content generated by the display manager 210 can include customized dashboards based on the sensor data received from the sensor array system 100 and/or the operational data generated by the operational profile module 204. For example, the display manager 210 may generate a dashboard associated with operation of the submersible pump 34 that includes a first element indicating an operational profile of the operational data that is associated with the operation of the submersible pump 34 and a second element indicating a portion of the sensor data corresponding to the submersible pump 34 that was utilized by the operational profile module 204 to generate the operational data. In certain embodiments, the display manager 210 includes an application programming interface (API) and/or a software development kit (SDK) that facilitate the integration of other applications with the display manager 210. For example, the display manager 210 may be configured to utilize the functionality of the user interface 300 interacting through an API.

In some embodiments, the display manager 210 is configured to generate an alarm based on the operational data generated by the operational profile module 204 such that an operator associated with the well device 28 is alerted regarding the operational data. For example, when the operational profile included in the operational data associated with the well device 28 indicates that a time till failure of the well device 28 is less than a failure threshold, the display manager 210 may generate a failure alarm and provide the failure alarm to the user interface 300 such that the failure alarm is provided to an operator associated with the well device 28 (e.g., associated with the user interface 300, etc.). The display manager 210 may generate the alarm and provide the alarm to the user interface 300 such that the operator may adjust the operation of the well device 28 prior to the failure of the well device 28.

In some embodiments, the system 200 is configured to generate control signals for the well device 28 based on the operational data generated by the operational profile module 204. For example, when the operational profile included in the operational data associated with the well device 28 indicates that a time till failure of the well device 28 is less than a failure threshold, the system 200 may generate a control signal associated with limiting and/or stopping operation of the well device 28. The system 200 may provide the control signal to the well device 28 (e.g., via the RTU 46, etc.) in order to prevent the failure of the well device 28.

Method for Identification of an Operation Profile

Figure 6:
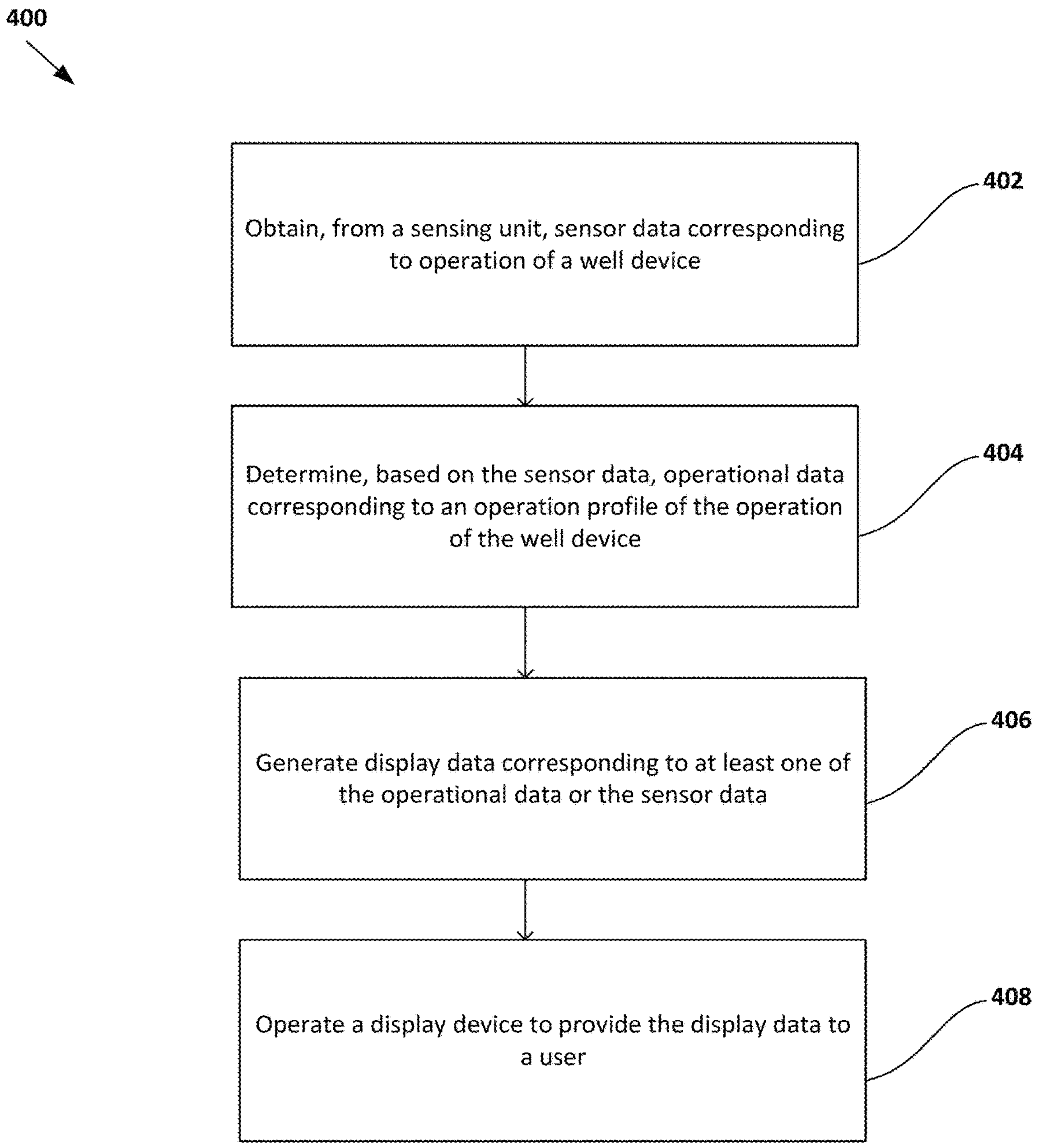
FIG. 6 illustrates a process flow chart of a method for identifying and displaying an operational profile associated with an operation of a well device, according to some embodiments.

Referring now to FIG. 6, a flow process diagram of a process 400 for identifying and displaying an operational profile associated with an operation of a well device is shown, according to some embodiments. Process 400 includes steps 402-408 and can be performed by the system 12, the system 200, and/or the computing devices 26, according to some embodiments. In other embodiments, process 400 can be at least partially performed by the RTU 46. For example, step 402 and step 408 may be performed by the RTU 46 while steps 404 and 406 may be performed by the system 12 and/or the computing devices 26. In still other embodiments, process 400 is fully performed by the RTU 46. In some embodiments, process 400 includes identifying changes in operations associated with will sites of hydrocarbon site 30. In other embodiments, process 400 includes identifying operational profiles corresponding to operations associated with other industrial sites (e.g., refineries, power plants, etc.).

Process 400 includes obtaining sensor data corresponding to operation of a well device (step 402), according to some embodiments. In some embodiments, the sensor data is obtained from a sensing unit associated with the well device. For example, the sensor data may be image data obtained from an image sensor associated with the well device and/or audio data obtained from an audio sensor associated with the well device. In some embodiments, step 402 is performed by the RTU 46. For example, step 402 may include the RTU 46 obtaining the sensor data from the sensor array system 100 associated with or included in the RTU 46. In some embodiments, step 402 includes obtaining at least one of the image data associated with a well device of the hydrocarbon site 30 from the image sensor 120 or the audio data associated with the well device of the hydrocarbon site 30 from the audio sensor 110. In some embodiments, step 402 includes obtaining the positional data associated with the image sensor 120 and/or the audio sensor 110 from the position sensor 130. For example, when the image sensor 120 and/or the audio sensor 110 are being moved (e.g., along the track 150, etc.), step 402 may include obtaining the positional data from the position sensor 130. In other embodiments, the sensor data can be provided from the RTU 46 or multiple of the RTUs 46 to the control engine 52, to the computing devices 26, and/or to the system 12. In some embodiments, step 402 includes obtaining the sensor data from other sensors of the RTU 46 associated with the well device (e.g., vibration sensors, strain gauges, etc.).

Process 400 includes determining operational data corresponding to an operational profile (e.g., an operational attribute, a diagnostic, a property, etc.) of the operation of the well device (step 404), according to some embodiments. In some embodiments, step 404 includes determining the operational profile based on the sensor data received during step 402. The operational profile may be associated with a classification of the operation of the well device. For example, the operational profile may be utilized to classify the operation of the well device as normal operation or abnormal operation based on the sensor data received in step 404. The operational profile may be determined based on the sensor data including image data associated with the operation of the well device, temperature data associated with the operation of the well device, sound data (e.g., audio data, etc.) generated by the operation of the well device, strain data associated with the operation of the well device, and/or other data received from sensors that is associated with the operation of the well device. In some embodiments, the operational profile module 204 may generate the operational data during step 404. For example, the operational profile module 204 may generate the operational data based on the image data received from the image sensor 120 during step 402 indicating a vibration associated with a component (e.g., a housing, a bolt, a hose, a pipe, etc.) of the well device 28. The operational profile module 204 may determine the operational profile of the operation of the well device 28 based on the vibration (e.g., based on a frequency of the vibration, based on an amplitude of the vibration, etc.). As another example, the operational profile module 204 may generate the operational data based on the audio data received from the audio sensor 110 during step 402 indicating a grinding sound associated with a component (e.g., a moving component, a gear, a belt, a sprocket, etc.) of the well device 28. The operational profile module 204 may determine the operational profile of the operation of the well device 28 based on a sound profile of the grinding sound.

In some embodiments, step 404 includes requesting additional sensor data from the sensing unit. The request for additional sensor data may be generated based on the operational data generated during step 404. For example, the operational data may indicate that additional analysis associated with the operation of the well device should be performed. In some embodiments, the operational profile module 204 may generate a request for additional sensor data corresponding to the well device 28 from the sensor array system 100 based on the operational profile included in the operational data. For example, if the operational profile indicates that the well device 28 has a leak, the operational profile module 204 may generate a request for additional image data corresponding to the well device 28 from the sensor array system 100 so that the operational profile module 204 can perform additional analysis associated with the operational profile of the well device 28.

In some embodiments, the operational profile is determined in step 404 based on a difference between the sensor data associated with the operation of the well device and historical sensor data associated with historical operation (e.g., past operation, etc.) of the well device. For example, the cloud-based computing system 12 may compare the sensor data received during step 402 with historical sensor data stored in a database (e.g., the data base 24, etc.) to determine the operational profile based on a difference between the sensor data and the historical sensor data. The historical sensor data may be associated with past operation of the well device and/or past operation of other well devices that are similar to the well device (e.g., well devices that are the same type of equipment, well devices that belong to the same hydrocarbon site 30, etc.) For example, when the historical sensor data includes historical audio data indicating a first sound profile associated with historical operation of the well device and the sensor data received during step 402 includes audio data indicating a second sound profile associated with the operation of the well device, step 404 may include comparing the first sound profile with the second sound profile to determine the operational profile associated with the operation of the well device. In some embodiments, the operational profile is determined to be abnormal operation based on a difference between the sensor data and the historical sensor data exceeding a comparison threshold. For example, if the sensor data includes image data indicating a first vibration pattern with a first frequency and the historical sensor data includes historical image data indicating a second vibration pattern with a second frequency, the operational profile may be determined to be abnormal operation when a difference between the first frequency and the second frequency is greater than a frequency difference threshold (e.g., greater than 12 Hz, etc.). As another example, when the sensor data includes audio data indicating a first sound profile with a first pitch and the historical sensor data includes historical audio data indicating a second sound profile with a second pitch, the operational profile may be determined to be normal operation when a difference between the first pitch and the second pitch is less than a pitch difference threshold.

In some embodiments, the operational profile is determined in step 404 based on at least a portion of the sensor data exceeding a sensor data threshold. For example, the operational profile module 204 may determine that the operational profile of the pumpjack 32 relates the high friction in the pumpjack 32 when the audio data corresponding to the pumpjack 32 and received from the audio sensor 110 includes a frequency that is above a frequency threshold that is associated with metal sliding along metal. As another example, the operational profile module 204 may determine that the operational profile of the submersible pump 34 relates to unexpected movement in components of the submersible pump 34 when the image data corresponding to the submersible pump 34 received from the image sensor 120 includes movement of a component that is greater than a movement threshold that is associated with components moving further than the components should (e.g., due to fasteners not being tight, due to wear in components, etc.).

In some embodiments, the operational profile is determined in step 404 based on at least a portion of the sensor data corresponding to known operational data (e.g., historical operational data, operational testing data, expected operational data, etc.). In some embodiments, the operational profile module 204 generates the operational data associated with the operational profile based at least partially on known operational data received from the data source 202. For example, when previous testing of the well device 28 indicates that audio data including a certain sound profile occurring at a certain frequency indicates that a grease level in a variable frequency drive of the well device 28 is below an operating threshold, the operational profile module 204 may determine that the operational profile of the well device 28 is associated with a low grease level in the variable frequency drive of the well device 28 based on a portion of the sensor data received during step 402 corresponding to the certain sound profile occurring at the certain frequency. As another example, when previous testing of a heat exchanger indicates that image data including a certain temperature profile along an outside surface of the heat exchanger indicates that that corrosion in the heat exchanger has exceeded a corrosion threshold, the operational profile module 204 may determine that the operational profile of the heat exchanger is associated with a corrosion level based on a portion of the image data received during step 402 corresponding to the certain temperature profile along the outside of the heat exchanger.

Process 400 includes generating display data corresponding to at least one of the operational data or the sensor data (step 406), according to some embodiments. The display data may include the operational profile included in the operational data associated with the operation of the well device. In some embodiments, the display manager 210 generates the display data corresponding to the operational data associated with the well device 28 and/or the sensor data corresponding to the operation of the well device 28 that was received from the sensor array system 100.

Process 400 includes operating a display device to provide the display data to a user (step 408) according to some embodiments. In some embodiments, step 408 is performed by the display manager 210 by providing the display data generated during step 406 to the user interface 300 such that the user is provided with the display data.

CONFIGURATION OF EXEMPLARY EMBODIMENTS

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system, comprising:
- industrial equipment configured to provide operations of an oil or gas facility;
- a sensor array system configured to provide sensor data associated with the operations of the industrial equipment; and
- a controller configured to:
  - receive, from the sensor array system, sensor data corresponding to the operations of the industrial equipment;
  - determine, based on the sensor data, operational data corresponding to a first operational profile of the operations of the industrial equipment;
  - receive, from the sensor array system, updated sensor data corresponding to the operations of the industrial equipment;
  - responsive to a difference between the sensor data and the updated sensor data exceeding a difference threshold, determine updated operational data corresponding to a second operational profile of the operations of the industrial equipment, the second operational profile different from the first operational profile;
  - generate display data corresponding to the updated operational data; and
  - operate a display device to provide the display data to a user.

2. The system of claim 1, wherein the sensor array system is positioned remote of the industrial equipment.

3. The system of claim 1, wherein sensor array system comprises:
- an audio sensor configured to provide a portion of the sensor data comprising audio data corresponding to the operations of the industrial equipment; and
- an image sensor configured to provide a portion of the sensor data comprising image data corresponding to the operations of the industrial equipment.

4. The system of claim 1, wherein:
- the sensor array system is configured to move between a first position relative to the industrial equipment and a second position relative to the industrial equipment;
- the sensor array system comprises:
  - a position sensor configured to provide a portion of the sensor data comprising position data corresponding to a position of the sensor array system relative to the industrial equipment; and
- the controller determines the operational data based on a first portion of the sensor data provided when the sensor array system is in the first position and a second portion of the sensor data provided when the sensor array system is in the second position.

5. The system of claim 3, wherein the controller comprises an image recognition module configured to implement image recognition methodology to determine image parameters associated with the image data provided by the image sensor.

6. The system of claim 1, wherein the controller comprises a synchronization module configured to synchronizes the sensor data by comparing timestamps associated with different portions of the sensor data provided by different sensors of the sensor array system and detecting errors associated with the timestamps using a timestamp correction algorithm.

7. The system of claim 1, wherein:
- the first operational profile corresponds to a first failure mode associated with the industrial equipment; and
- the second operational profile corresponds to a second failure mode associated with the industrial equipment, the second failure mode different from the first failure mode.

8. The system of claim 1, wherein:
- the sensor array system comprises an audio sensor configured to provide a portion of the sensor data comprising audio data corresponding to the operations of the industrial equipment; and
- the controller identifies the difference between the sensor data and the updated sensor data based on differences between a first audio profile of the audio data of the sensor data and a second audio profile of the audio data of the updated sensor data.

9. A method comprising:
- obtaining, from a sensor array system, sensor data corresponding to an operation of a well device of an oil or gas facility;
- determining, based on the sensor data, operational data corresponding to a first operational profile of operations of the well device;
- obtaining, from the sensor array system, updated sensor data corresponding to the operation of the well device;
- responsive to a difference between the sensor data and the updated sensor data exceeding a difference threshold, determining updated operational data corresponding to a second operational profile of the operation of the well device, the second operational profile different from the first operational profile;
- generating display data corresponding to the updated operational data; and
- operating a display device to provide the display data to a user.

10. The method of claim 9, wherein the sensor array system is positioned remote of the well device.

11. The method of claim 9, wherein sensor array system comprises:

an audio sensor configured to provide a portion of the sensor data comprising audio data corresponding to operations of the well device; and an image sensor configured to provide a portion of the sensor data comprising image data corresponding to the operations of the well device.

12. The method of claim 11, further comprising:

implementing an image recognition methodology to determine image parameters associated with the image data provided by the image sensor.

13. The method of claim 9, further comprising:

synchronizing the sensor data by comparing timestamps associated with different portions of the sensor data associated with different sensors of the sensor array system and detecting errors associated with the timestamps using a timestamp correction algorithm.

14. The method of claim 9, wherein:

the first operational profile corresponds to a first failure mode associated with the well device; and the second operational profile corresponds to a second failure mode associated with the well device, the second failure mode different from the first failure mode.

15. The method of claim 9, wherein:

the sensor array system comprises an audio sensor configured to provide a portion of the sensor data comprising audio data corresponding to the operations of the well device; and the difference between the sensor data and the updated sensor data is identified based on differences between a first audio profile of the audio data of the sensor data and a second audio profile of the audio data of the updated sensor data.

16. A system for use with equipment configured to provide operations of an oil or gas facility and a sensor array system configured to provide sensor data associated with the operations of the equipment, the system comprising:

a controller configured to:

receive, from the sensor array system, sensor data corresponding to the operations of the equipment;

determine, based on the sensor data, operational data corresponding to a first operational profile of the operations of the equipment;

receive, from the sensor array system, updated sensor data corresponding to the operations of the equipment;

responsive to a difference between the sensor data and the updated sensor data exceeding a difference threshold, determine updated operational data corresponding to a second operational profile of the operations of the equipment, the second operational profile different from the first operational profile;

generate display data corresponding to the updated operational data; and operate a display device to provide the display data to a user.

17. The system of claim 16, wherein:

the sensor array system comprises an image sensor configured to provide a portion of the sensor data comprising image data corresponding to the operations of the equipment; and the controller comprises an image recognition module configured to implement image recognition methodology to determine image parameters associated with the image data provided by the image sensor.

18. The system of claim 16, wherein the controller comprises a synchronization module configured to synchronizes the sensor data by comparing timestamps associated with different portions of the sensor data provided by different sensors of the sensor array system and detecting errors associated with the timestamps using a timestamp correction algorithm.

19. The system of claim 16, wherein:

the first operational profile corresponds to a first failure mode associated with the equipment; and the second operational profile corresponds to a second failure mode associated with the equipment, the second failure mode different from the first failure mode.

20. The system of claim 16, wherein:

the sensor array system comprises an audio sensor configured to provide a portion of the sensor data comprising audio data corresponding to the operations of the equipment; and the controller identifies the difference between the sensor data and the updated sensor data based on differences between a first audio profile of the audio data of the sensor data and a second audio profile of the audio data of the updated sensor data.

* * * * *